(12) United States Patent
Cho

(10) Patent No.: US 8,879,142 B2
(45) Date of Patent: Nov. 4, 2014

(54) DISPLAY APPARATUS AND METHOD OF MANUFACTURING THE SAME

(75) Inventor: Youngjoon Cho, Suwon-si (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 180 days.

(21) Appl. No.: 13/315,426

(22) Filed: Dec. 9, 2011

(65) Prior Publication Data

US 2012/0243072 A1   Sep. 27, 2012

(30) Foreign Application Priority Data

Mar. 24, 2011   (KR) .................. 10-2011-0026561

(51) Int. Cl.
  *G02B 26/00*   (2006.01)
  *H01J 9/00*   (2006.01)
  *G02F 1/167*   (2006.01)

(52) U.S. Cl.
  CPC .. *G02F 1/167* (2013.01); *H01J 9/00* (2013.01)
  USPC .......................................... 359/296; 359/290

(58) Field of Classification Search
  USPC ................................. 359/290–296
  See application file for complete search history.

(56) References Cited

U.S. PATENT DOCUMENTS

| 7,903,321 B2* | 3/2011 | Ahn et al. ........... 359/296 |
| 2006/0285195 A1* | 12/2006 | Moriyama et al. ........... 359/296 |
| 2009/0251763 A1* | 10/2009 | Sprague et al. ........... 359/296 |
| 2010/0001946 A1* | 1/2010 | Murayama et al. ........... 345/107 |

FOREIGN PATENT DOCUMENTS

| JP | 2005-173044 | 6/2005 |
| JP | 2008-276153 | 11/2008 |
| KR | 1020090061498 | 6/2009 |

* cited by examiner

*Primary Examiner* — Mahidere Sahle
(74) *Attorney, Agent, or Firm* — F. Chau & Associates, LLC

(57) ABSTRACT

In a manufacturing method of a display apparatus, a substrate including a first area, which includes a first pixel, and a second area different from the first area is prepared. Then, a first capsule layer having first display capsules is formed on the substrate, and a first photolithography process is performed on the first capsule layer to remove the first capsule layer from the second area and to form a first capsule pattern on the first area.

20 Claims, 23 Drawing Sheets

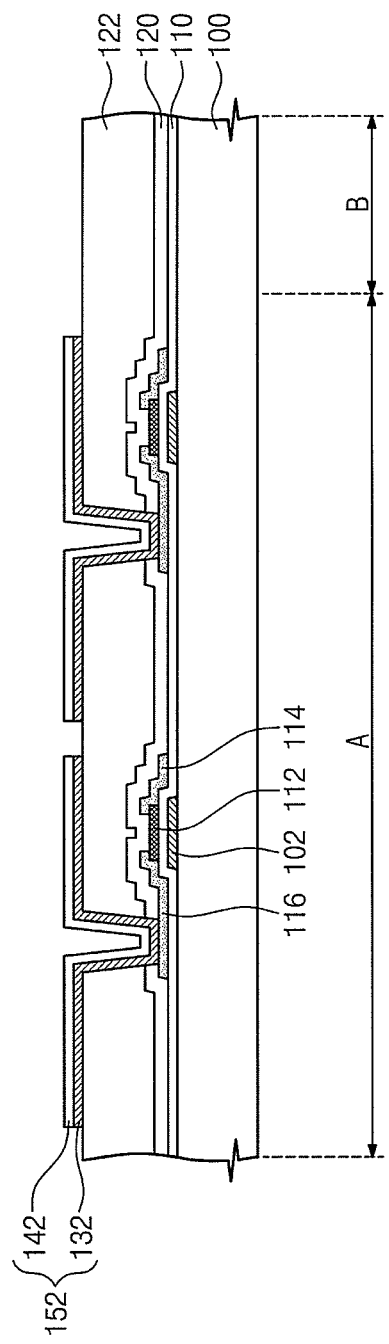

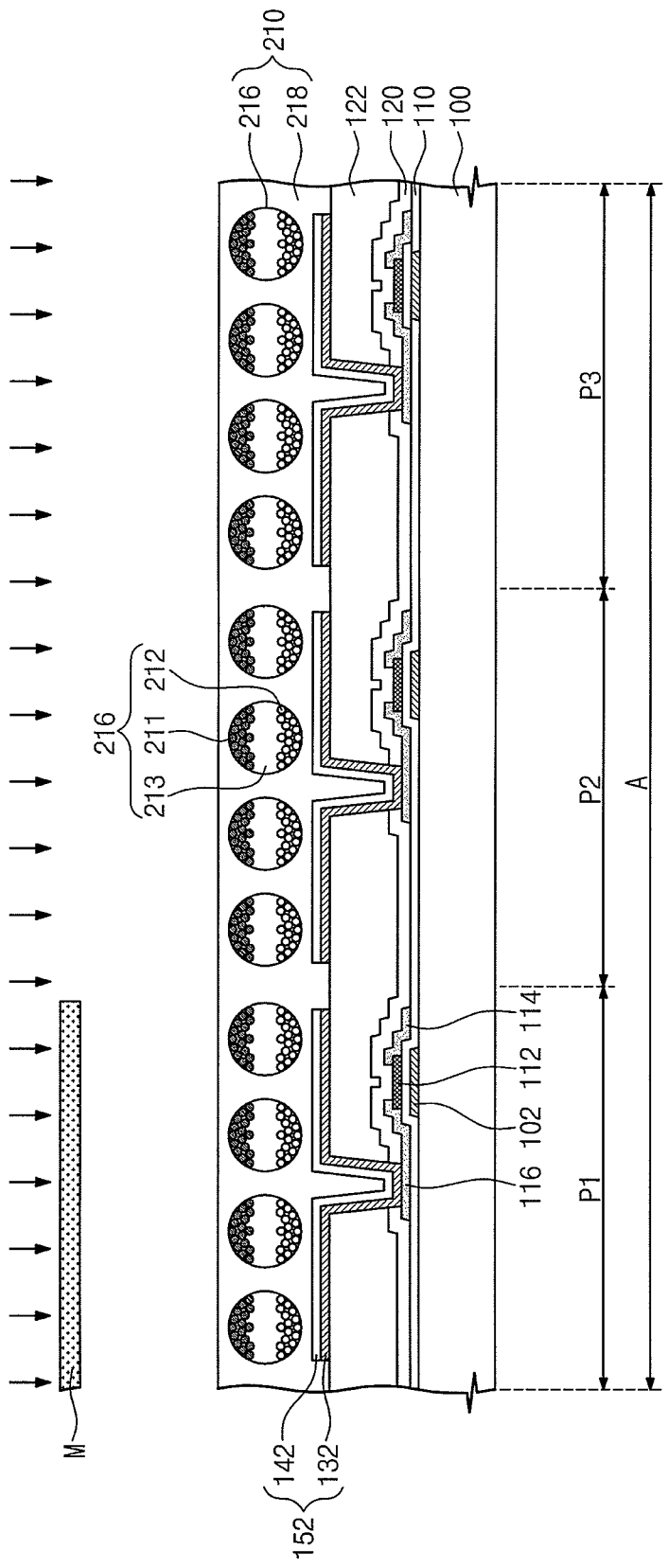

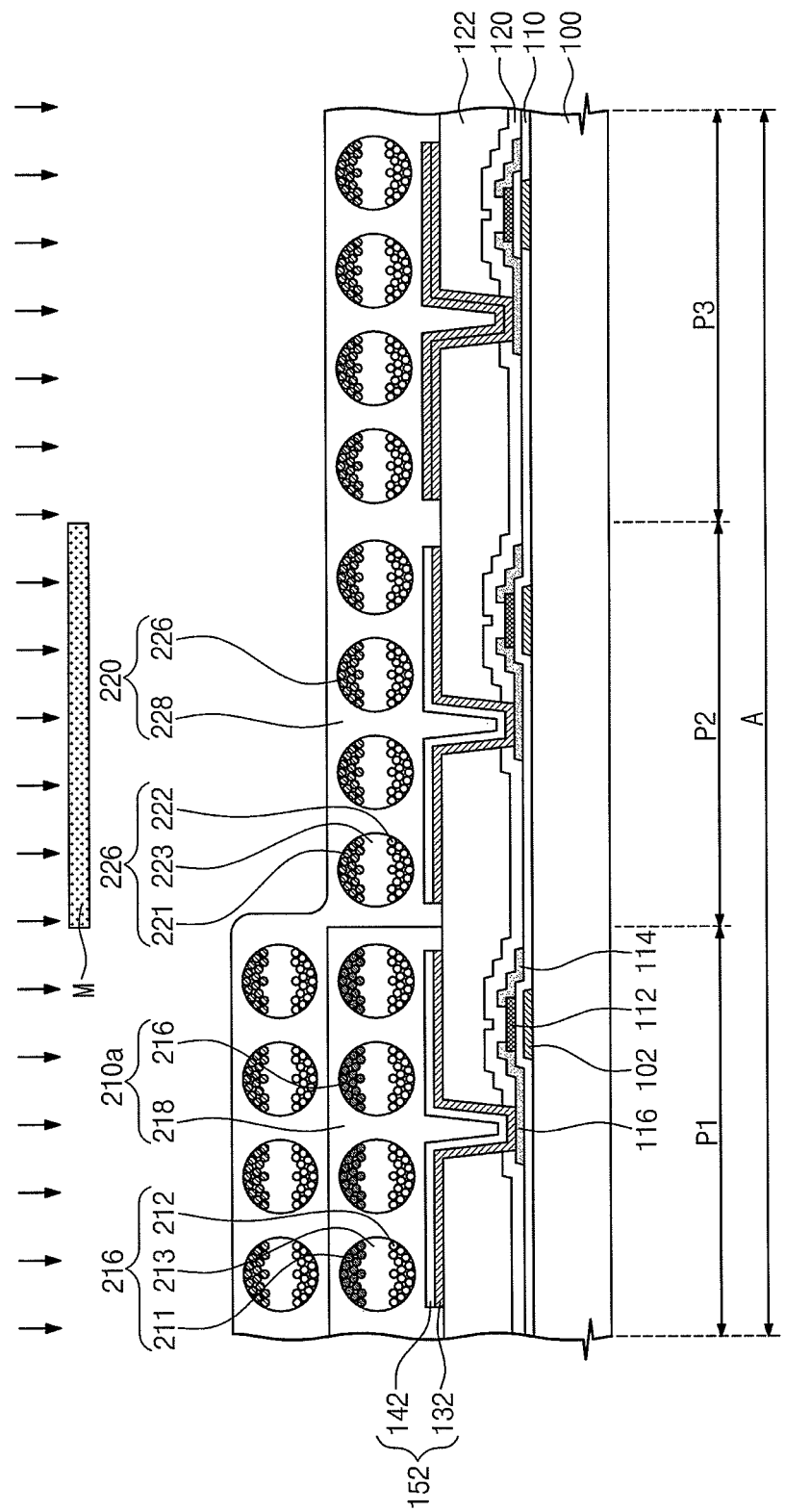

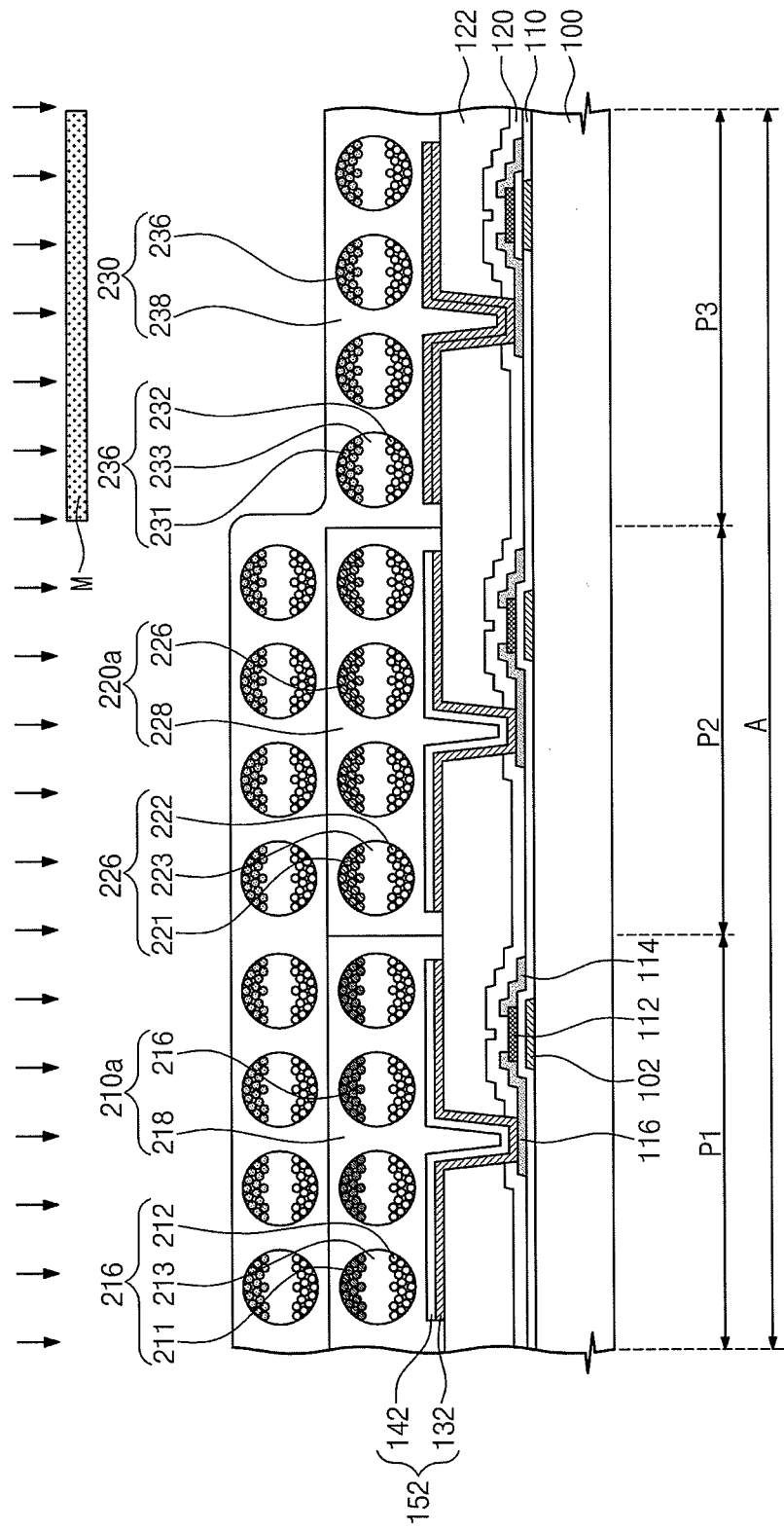

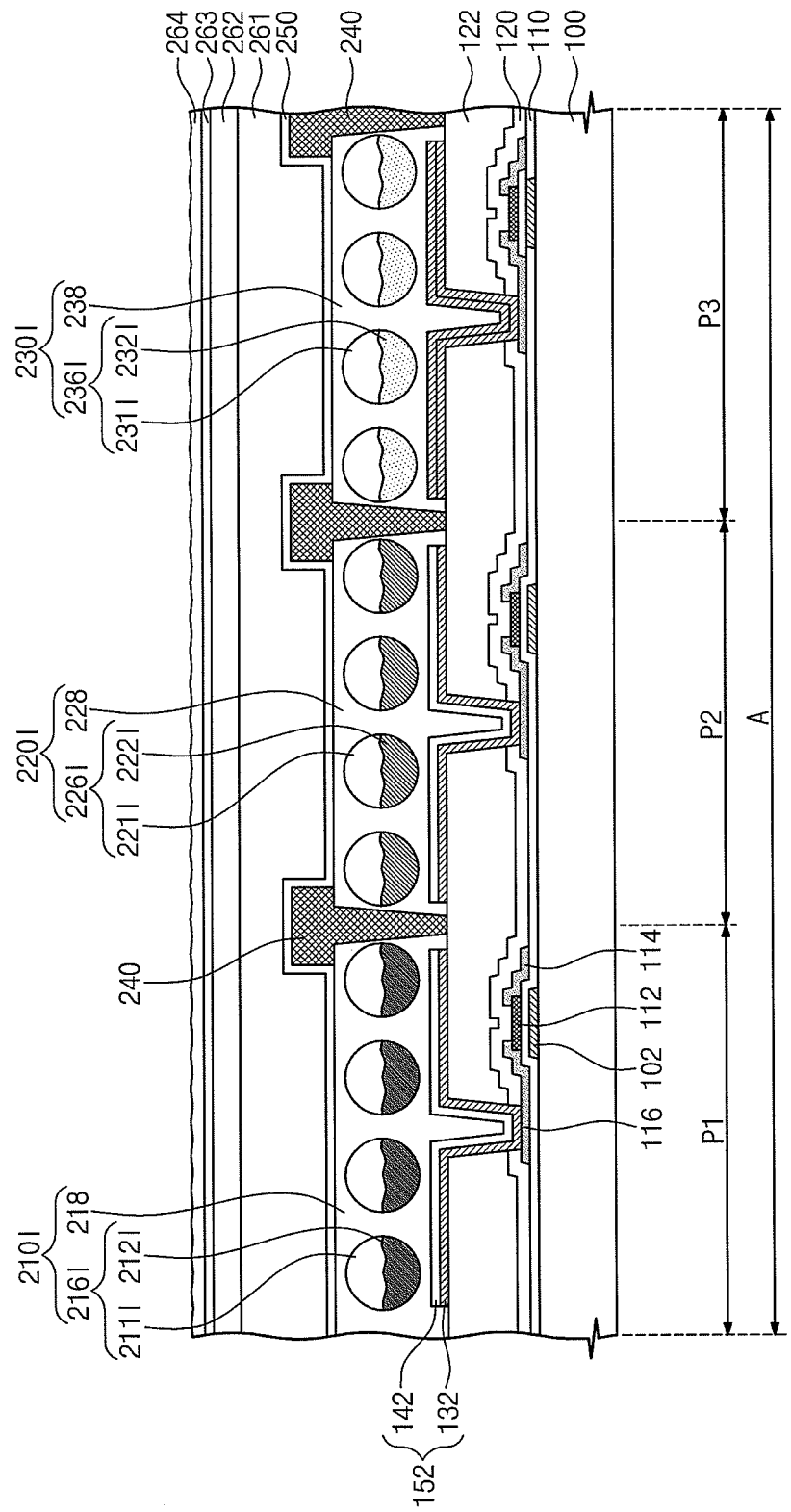

DISPLAY APPARATUS AND METHOD OF MANUFACTURING THE SAME

CROSS-REFERENCE TO RELATED APPLICATION

This application relies for priority upon Korean Patent Application No. 10-2011-0026561 filed on Mar. 24, 2011, the contents of which are herein incorporated by reference in its entirety.

BACKGROUND

1. Technical Field

The embodiments of the present invention are directed to a display apparatus and a method of manufacturing the display apparatus.

2. Discussion of the Related Art

Demand for reliable display devices for various devices, such as television sets, computers, mobile phones, PDAs, etc, is growing. As an effort to meet the demand, there is research going on in the industry to develop display apparatuses that can display images by applying electric fields to capsules, each including a plurality of elements.

SUMMARY

Exemplary embodiments of the present invention provide a display apparatus having high reliability and a method of manufacturing the display apparatus.

According to an exemplary embodiment, a display apparatus includes a substrate including a display area which includes a plurality of pixels and a non-display area surrounding the display area and a capsule pattern on the display area, wherein the capsule pattern includes display capsules and a cured photosensitive material surrounding the display capsules. Each of the display capsules includes an element that is moved by applying an electric field to the display capsules.

The display apparatus further includes a common electrode on the display capsules, wherein the common electrode covers a sidewall of the capsule pattern adjacent to the non-display area.

The display apparatus further includes an organic layer contacting the common electrode. The organic layer covers the common electrode on the sidewall of the capsule pattern.

The display area includes first, second, and third areas. The display capsules include first, second, and third display capsules respectively including first, second, and third elements that respectively display first, second, and third colors. The capsule pattern includes first, second, and third sub capsule patterns including the first, second, and third display capsules, respectively, which are disposed on the first, second, and third areas, respectively.

The display apparatus further includes a common electrode on the capsule pattern and a plurality of black matrices on border areas between the first, second, and third areas. The common electrode covers the black matrices.

According to an exemplary embodiment, a method of manufacturing a display apparatus is provided as follows. A substrate including a first area which includes a first pixel and a second area is prepared. A first capsule layer having one or more first display capsules is formed on the substrate. Then, a first photolithography process is performed to remove the first capsule layer from the second area and to form a first capsule pattern on the first area. Each of the first display capsules includes a first element having a first color. The first element is moved by applying an electric field to the first display capsules.

The first area includes a display area, and the second display area includes a non-display area.

The second area includes a second pixel. The substrate further includes a third area that includes a third pixel. The first capsule layer is formed on the third area and removed from the third area by the first photolithography process.

A second capsule layer having second display capsules is formed on the substrate, and a second photolithography process is performed on the second capsule layer to remove the second capsule layer from the first area and the third area and to form a second capsule pattern on the second area. A third capsule layer having third display capsules is formed on the substrate, and a third photolithography process is performed on the third capsule layer to remove the third capsule layer from the first area and the second area and to faun a third capsule pattern on the third area.

Each of the second display capsule includes a second element having a second color. The second element is moved by applying an electric field to the second display capsules. Each of the third display capsules includes a third element having a third color. The third element is moved by applying an electric field to the third display capsule.

According to an embodiment of the present invention, there is provided a method of manufacturing a display apparatus, comprising preparing a substrate including a display area and a non-display area, forming a capsule layer on the substrate, wherein the capsule layer includes a plurality of capsules and a material film surrounding the capsules, wherein each of the capsules includes an element that is moved by application of an electric field, and performing photolithography on the capsule layer to remove the capsule layer from the non-display area.

The method further comprises forming a common electrode to cover a top surface and a side surface of a remaining part of the capsule layer and to cover a common voltage contact through which the common electrode is connected to a common voltage line.

According to the embodiments, the first capsule layer having the first display capsule is formed on the substrate including the first area and the second area. Then, the photolithography process is performed to remove the first capsule layer from the second area and to form the first capsule pattern on the first area. Thus, a color reproducibility of the display apparatus may be improved, and a manufacturing cost of the display apparatus may be reduced.

BRIEF DESCRIPTION OF THE DRAWINGS

The embodiments of the present invention will become readily apparent by reference to the following detailed description when considered in conjunction with the accompanying drawings wherein:

FIGS. 3A, 4A, 5A, and 6A and 3B, 4B, 5B, and 6B are cross-sectional views illustrating a method of manufacturing a display apparatus according to an exemplary embodiment of the present invention;

FIGS. 8A, 9A, 10A, and 11A and 8B, 9B, 10B, and 11B are cross-sectional views illustrating a method of manufacturing a display apparatus according to an exemplary embodiment of the present invention; and FIGS. 12A and 12B are cross-sectional views illustrating a method of manufacturing a display apparatus according to an exemplary embodiment of the present invention.

DETAILED DESCRIPTION

Figure 1:
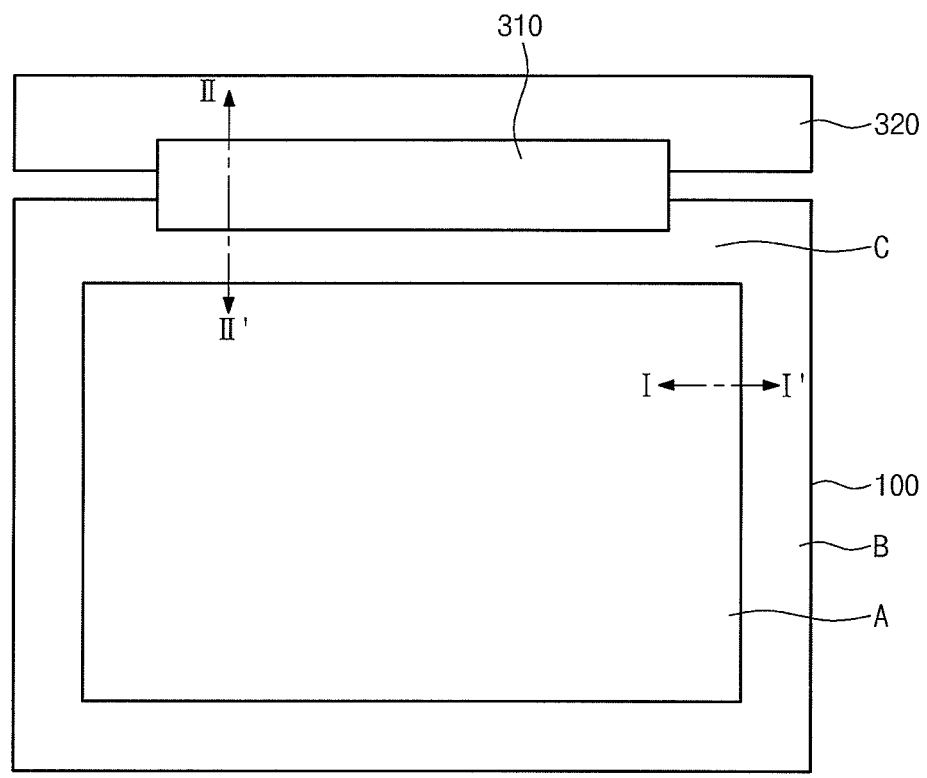
FIG. 1 is a plan view showing a display apparatus according to an exemplary embodiment of the present invention.

It will be understood that when an element or layer is referred to as being "on", "connected to" or "coupled to" another element or layer, it can be directly on, connected or coupled to the other element or layer or intervening elements or layers may be present.

Hereinafter, the embodiments of the present invention will be explained in detail with reference to the accompanying drawings, wherein the same reference numerals may be used to denote the same or substantially the same elements throughout the specification and the drawings.

Figure 2A:
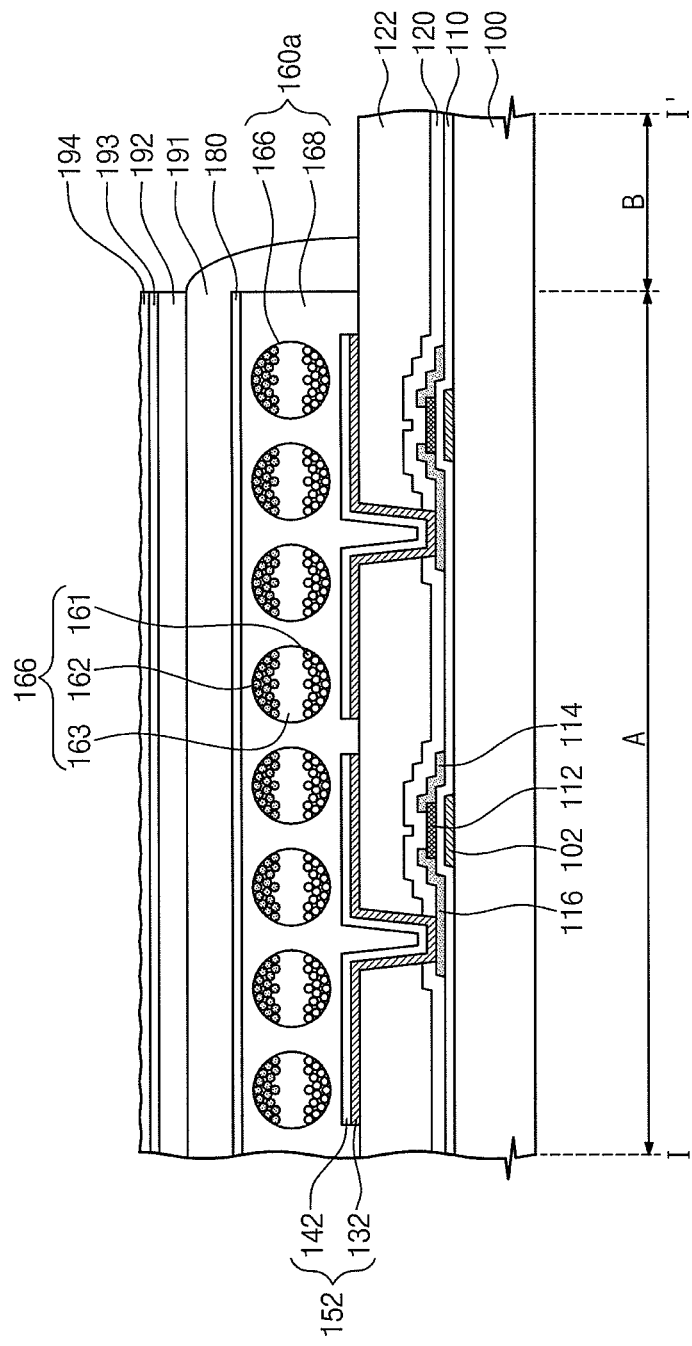
FIGS. 2A and 2B are cross-sectional views taken along lines I-I' and II-II', respectively, to show a display apparatus according to an exemplary embodiment of the present invention.
Figure 2B:
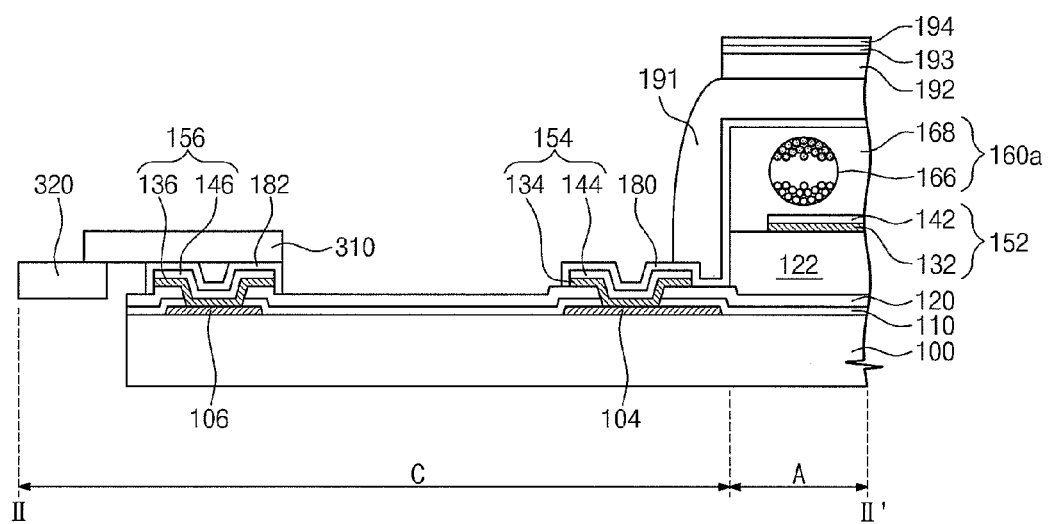

FIG. 1 is a plan view showing a display apparatus according to an exemplary embodiment of the present invention, and FIGS. 2A and 2B are cross-sectional views taken along lines I-I' and II-II', respectively, to show a display apparatus according to an exemplary embodiment of the present invention.

Referring to FIGS. 1, 2A, and 2B, a substrate 100 including a first area and a second area is prepared. The first area and the second area are different from each other. The first area is a display area A which includes a plurality of pixels and displays an image. Each pixel includes a thin film transistor as a switching device.

The second area includes non-display areas B and C. The non-display areas B and C include a peripheral area B and a contact area C. A common voltage line 104 and a pad electrode 106 are disposed in the contact area C. The common voltage line 104 is used to apply a common voltage to the pixels. The pad electrode 106 receives signals from a flexible printed circuit board 310 and a printed circuit board 320 to drive a thin film transistor. The peripheral area B is an area other than the contact area C of the non-display area B and C.

A gate electrode 102 is disposed on the display area A. The common voltage line 104 and the pad electrode 106 are disposed on the contact area C. The common voltage line 104 and the pad electrode 106 are spaced apart from each other. The gate electrode 102, the common voltage line 104, and the pad electrode 106 are formed by the same process. The gate electrode 102, the common voltage line 104, and the pad electrode 106 include the same material. For instance, according to an embodiment, the gate electrode 102, the common voltage line 104, and the pad electrode 106 includes at least one of molybdenum (Mo), aluminum (Al), silver (Ag), copper (Cu), chromium (Cr), titanium (Ti), or tantalum (Ta).

A gate insulating layer 110 is disposed on the substrate 100 to cover the gate electrode 102, the common voltage line 104, and the pad electrode 106. The gate insulating layer 110 includes an insulating material.

A semiconductor pattern 112 is disposed on the gate insulating layer 110 to overlap the gate electrode 102. The semiconductor pattern 112 includes a semiconductor material. For example, according to an embodiment, the semiconductor pattern 112 includes single crystalline silicon, polycrystalline silicon, or amorphous silicon.

A source electrode 114 and a drain electrode 116 are disposed on the gate insulating layer 110 to respectively overlap two opposite ends of the semiconductor pattern 112, which correspond to two opposite ends of the gate electrode 102.

The gate electrode 102, the gate insulating layer 110, the semiconductor pattern 112, the source electrode 114, and the drain electrode 116 are included in a thin film transistor that serves as a switching device of a pixel.

First and second insulating layers 120 and 122 are sequentially disposed on the gate insulating layer 110 to cover the source electrode 114 and the drain electrode 116. According to an embodiment, the first and second insulating layers 120 and 122 include different materials from each other. For instance, according to an embodiment, the first insulating layer 120 includes at least one of silicon nitride, silicon oxide, or silicon oxy-nitride, and the second insulating layer 122 includes an organic layer. According to an exemplary embodiment, the first insulating layer 120 is disposed on the contact area C to cover the common voltage line 104 and the pad electrode 106, but the second insulating layer 122 is not disposed on the contact area C.

A pixel electrode 152 penetrates the first and second insulating layers 120 and 122 and contacts the drain electrode 116. The pixel electrode 152 includes a flat portion on the second insulating layer 122, a sidewall portion penetrating through the first and second insulating layers 120 and 122, and a contact portion contacting the drain electrode 116. An inner space is defined in the first and second insulating layers 120 and 122, which is surrounded by the sidewall portion of the pixel electrode 152.

The pixel electrode 152 includes a lower pixel electrode 132 and an upper pixel electrode 142. According to an embodiment, the lower pixel electrode 132 and the upper pixel electrode 142 include different materials from each other. For example, according to an embodiment, the lower pixel electrode 132 includes at least one of molybdenum (Mo), aluminum (Al), silver (Ag), copper (Cu), chromium (Cr), titanium (Ti), or tantalum (Ta), and the upper pixel electrode 142 includes a transparent conductive material. According to an embodiment, the lower pixel electrode 132 reflects light incident toward the substrate 100 from an exterior source (not shown). According to an embodiment, the pixel electrode 152 has a single-layer structure.

According to an exemplary embodiment, each pixel includes a thin film transistor and a pixel electrode 152. According to an embodiment, a plurality of thin film transistors and a plurality of pixels electrodes 152 connected to the plurality of thin film transistors are provided. The pixels are arranged in a matrix form along a first direction and a second direction substantially perpendicular to the first direction.

A common voltage contact 154 penetrates through the first insulating layer 120 and the gate insulating layer 110 and contacts the common voltage line 104. The common voltage contact 154 includes a lower common voltage contact 134 and an upper common voltage contact 144 on the lower common voltage contact 134. According to an embodiment, the lower and upper common voltage contacts 134 and 144 are formed by the same processes used to form the lower and upper pixel electrodes 132 and 142, respectively. According to an embodiment, the lower and upper common voltage contacts 134 and 144 include the same materials as the lower and upper pixel electrodes 132 and 142, respectively. According to an embodiment, the common voltage contact 154 has a single-layer structure.

A pad contact 156 penetrates through the first insulating layer 120 and the gate insulating layer 110 and contacts the pad electrode 106. The pad contact 156 includes a lower pad contact 136 and an upper pad contact 146 on the lower pad contact 136. According to an embodiment, the lower and upper pad contacts 136 and 146 are formed by the same processes as applied to form the lower and upper pixel electrodes 132 and 142, respectively. According to an embodiment, the lower and upper pad contacts 136 and 146 include the same materials as the lower and upper pixel electrodes 132 and 142, respectively. According to an embodiment, the pad contact 156 has a single-layer structure.

A capsule pattern 160a is disposed on the pixel electrode 152 in the display area A. The capsule pattern 160a includes display capsules 166 and a material pattern 168 surrounding the display capsules 166. The material pattern 168 includes a cured photosensitive material such as a cured photoresist material.

Each display capsule 166 includes a first element 161, a second element 162, and a medium 163 surrounding the first and second elements 161 and 162. The first and second elements 161 and 162 are distributed in the medium 163. The first element 161 has a different color from a color of the second element 162. According to an exemplary embodiment, the first and second elements 161 and 162 include electrophoretic particles. According to an embodiment, the first and second elements 161 and 162 are electrified to have different polarities from each other. According to an embodiment, the first and second elements 161 and 162 are electrified with the same polarity but different electrification amounts from each other. When an electric field is applied to the display capsule 166, the first and second elements 161 and 162 are moved. Although it is illustrated in FIG. 2A that two elements, such as the first and second elements 161 and 162, are disposed in the display capsule 166, the number of elements in the display capsule 166 is not limited thereto. Although it is illustrated in the figures that the display capsule 166 has a circular shape, according to an embodiment, the display capsule 166 is formed to have a polyhedron shape.

A common electrode 180 is disposed on the capsule pattern 160a. The common electrode 180 includes a transparent conductive material. The common electrode 180 covers a sidewall of the capsule pattern 160a and a sidewall of the second insulating layer 122, which are adjacent to the contact area C. The common electrode 180 covers the common voltage contact 154. The common electrode 180 contacts the common voltage contact 154 to be applied with a common voltage from the common voltage line 104.

According to an exemplary embodiment, the common electrode 180 is directly connected to the common voltage contact 154 and receives the common voltage from the common voltage line 104. Thus, a process of connecting the common electrode 180 to the common voltage line 104 may be omitted. Since the sidewall of the capsule pattern 160a on the display area A is covered by the common electrode 180, a process of sealing the capsule pattern 160a may be omitted. Accordingly, the manufacturing process of the display apparatus may be simplified and the manufacturing cost of the display apparatus may be reduced.

An electric field is applied to the display capsules 166 by a voltage difference between the common electrode 180 and the pixel electrode 152, so that the first element 161 and/or the second element 162 moves to the common electrode 180 and/or the pixel electrode 152, thereby displaying an image.

A capping electrode 182 covers the pad contact 156. The capping electrode 182 is formed by the same process as the common electrode 180. According to an embodiment, the capping electrode 182 has the same material as the common electrode 180.

According to an embodiment, a plurality of additional layers are disposed on the common electrode 180 in the display area A. The additional layers include an organic layer 191, a barrier layer 192, a coating layer 193, and a support layer 194, which are sequentially stacked on the common electrode 180. The organic layer 191 covers sidewalls of the capsule pattern 160a adjacent to the non-display area B and C. The organic layer 191 covers the common electrode 180 that covers the sidewall of the capsule pattern 160a adjacent to the contact area C. The barrier layer 192 and the coating layer 193 serve as protecting layers to protect the organic layer 191 and the capsule pattern 160a. The support layer 194 includes concavo-convex portions on a top surface. According to an embodiment, at least one of the additional layers may be omitted.

The flexible printed circuit board 310 is connected to the capping electrode 182. The flexible printed circuit board 310 is connected to the pad electrode 106 through the capping electrode 182 and the pad contact 156.

The printed circuit board 320 is connected to the flexible printed circuit board 310. The printed circuit board 320 is connected to the pad electrode 106 through the flexible printed circuit board 310. The printed circuit board 320 applies a signal used to drive the thin film transistor and/or a voltage applied to the pixel electrode 152 to the pad electrode 106.

Hereinafter, a method of manufacturing the display apparatus will be described according to an exemplary embodiment.

FIGS. 3A to 6A are cross-sectional views taken along a line I-I' of FIGS. 1, and 3B to 6B are cross-sectional views taken along a line II-II' of FIG. 1.

Figure 3B:
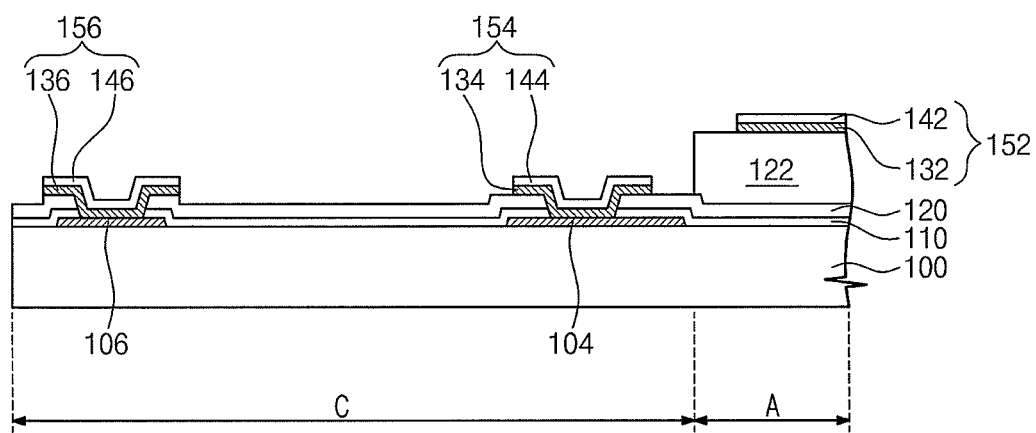

Referring to FIGS. 3A and 3B, the substrate 100 including the first and second areas is prepared. The first area is the display area A where the pixels are arranged and the second area is the non-display area B and C including the peripheral area B and the contact area C.

The gate electrode 102 is formed in the display area A, and the common voltage line 104 and the pad electrode 106 are formed in the contact area C. The gate electrode 102, the common voltage line 104, and the pad electrode 106 are formed by the same process. According to an embodiment, the gate electrode 102, the common voltage line 104, and the pad electrode 106 are formed by a single process. For instance, according to an embodiment, a conductive layer is formed on the substrate 100 and then patterned, thereby forming the gate electrode 102, the common voltage line 104, and the pad electrode 106 as described above. The common voltage line 104 and the pad electrode 106 are spaced apart from each other.

The gate insulating layer 110 is formed on the substrate 100 to cover the gate electrode 102, the common voltage line 104, and the pad electrode 106.

The semiconductor pattern 112 is formed on the gate insulating layer 110 to overlap the gate electrode 102. The semiconductor pattern 112 is formed of polycrystalline silicon or amorphous silicon, but the embodiments of the present invention are not limited thereto. For example, according to an embodiment, the semiconductor pattern 112 includes a compound semiconductor material. According to embodiments, the semiconductor pattern 112 is formed by performing a crystallization process on a semiconductor material formed on the substrate 100. According to embodiments, the crystallization process includes an excimer laser annealing (ELA)

process, a sequential lateral solidification (SLS) process, or a super grain silicon (SGS) process.

The source and drain electrodes 114 and 116 are formed on the insulating layer 110 to respectively overlap two opposite ends of the semiconductor pattern 112, which correspond to two opposite ends of the gate electrode 102, respectively.

The first and second insulating layers 120 and 122 are sequentially formed on the gate insulating layer 110 to cover the source and drain electrodes 114 and 116. The first insulating layer 120 covers the common voltage line 104 and the pad electrode 106.

The pixel electrode 152 is formed on the second insulating layer 122 and contacts the drain electrode 116 through a first contact hole penetrating the first and second insulating layers 120 and 122. The pixel electrode 152 includes the lower pixel electrode 132 and the upper pixel electrode 142.

The common voltage contact 154 is formed on the first insulating layer 120 and contacts the common voltage line 104 through a second contact hole penetrating the first insulating layer 120 and the gate insulating layer 110. The common voltage contact 154 includes the lower common voltage contact 134 and the upper common voltage contact 144 on the lower common voltage contact 134.

The pad contact 156 is formed on the first insulating layer 120 and contacts the pad electrode 106 through a third contact hole penetrating the first insulating layer 120 and the gate insulating layer 110. The pad contact 156 includes the lower pad contact 136 and the upper pad contact 146 on the lower pad contact 136.

The lower pixel electrode 132, the lower common voltage contact 134, and the lower pad contact 136 are formed by the same process. In detail, the lower pixel electrode 132, the lower common voltage contact 134, and the lower pad contact 136 may be formed by forming the first, second, and third contact holes and by forming and patterning a first conductive layer.

The upper pixel electrode 142, the upper common voltage contact 144, and the upper pad contact 146 are formed by the same process. In detail, the upper pixel electrode 142, the upper common voltage contact 144, and the upper pad contact 146 may be formed by forming a second conductive layer to cover the lower pixel electrode 132, the lower common voltage contact 134, and the lower pad contact 136 and by patterning the second conductive layer.

According to an embodiment, the first and second conductive layers include different materials. For example, according to an embodiment, the first conductive layer includes a non-transparent material (e.g., metal materials) and the second conductive layer includes a transparent material. Although not shown in figures, each of the pixel electrode 152, the common voltage contact 154, and the pad contact 156 may be formed in a single-layer structure.

Figure 4A:
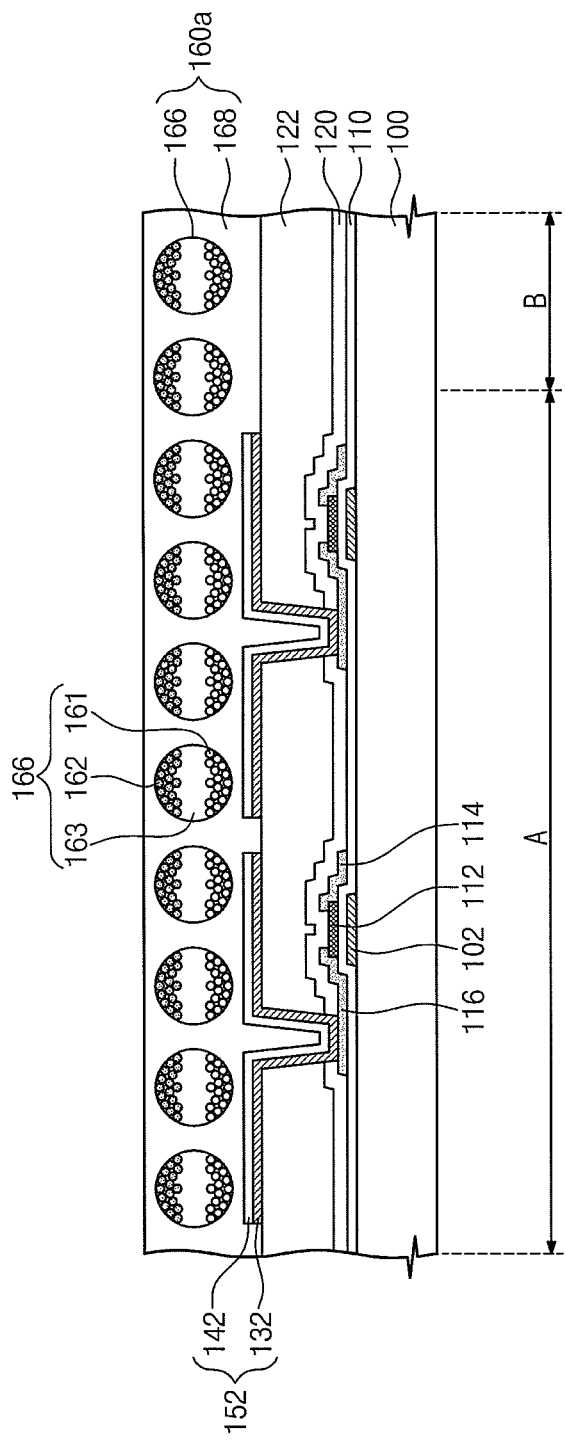
Figure 4B:
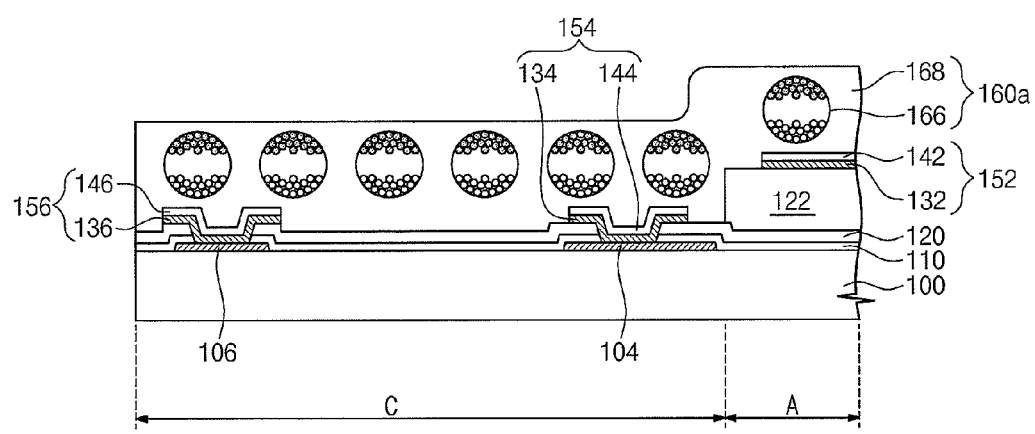

Referring to FIGS. 4A and 4B, a capsule layer 160 is coated over the substrate 100 to cover the pixel electrode 152, the common voltage contact 154, and the pad contact 156. The capsule layer 160 includes the display capsules 166 and the material layer 168 surrounding the display capsules 166. The material layer 168 includes a photosensitive material, such as a photoresist layer or an organic layer. Each display capsule 166 includes the first and second elements 161 and 162 and the medium 163 surrounding the first and second elements 161 and 162.

The inner spaces defined by the pixel electrode 152, the common voltage contact 154, and the pad contact 156 in the first, second, and third contact holes are filled with the capsule layer 160.

Figure 5A:
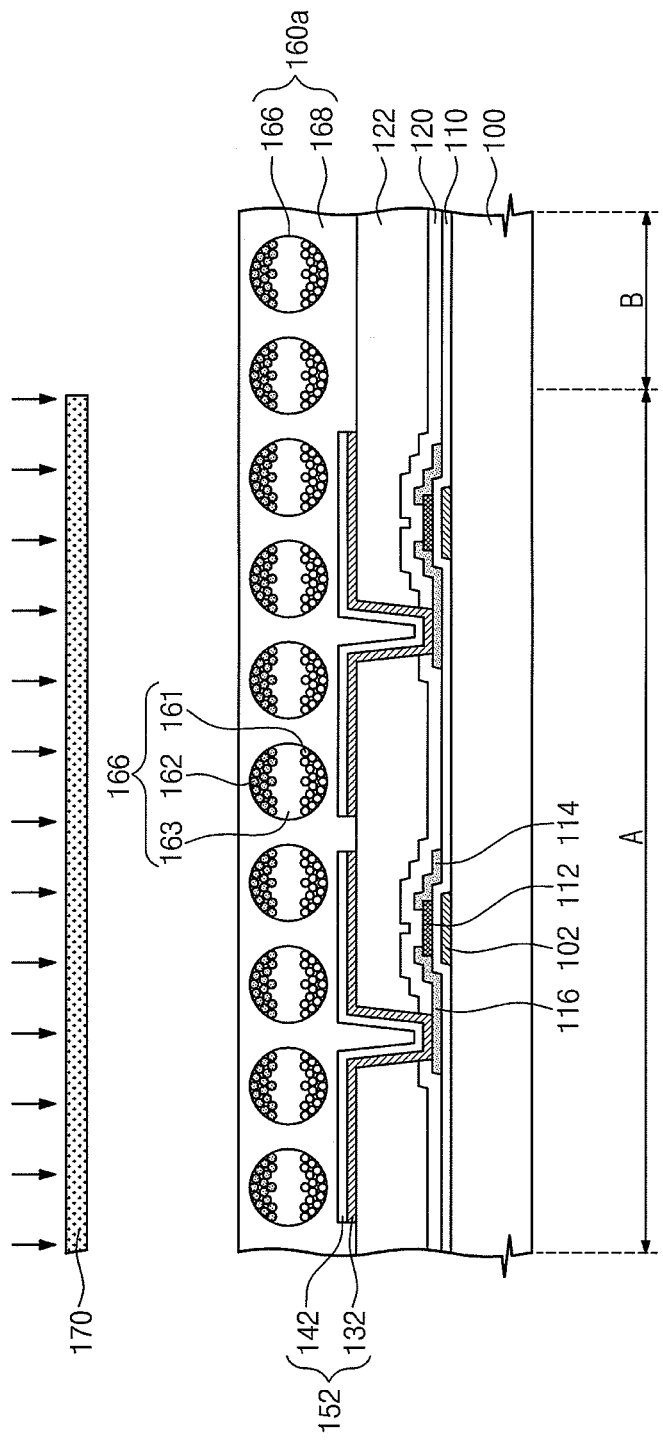
Figure 5B:
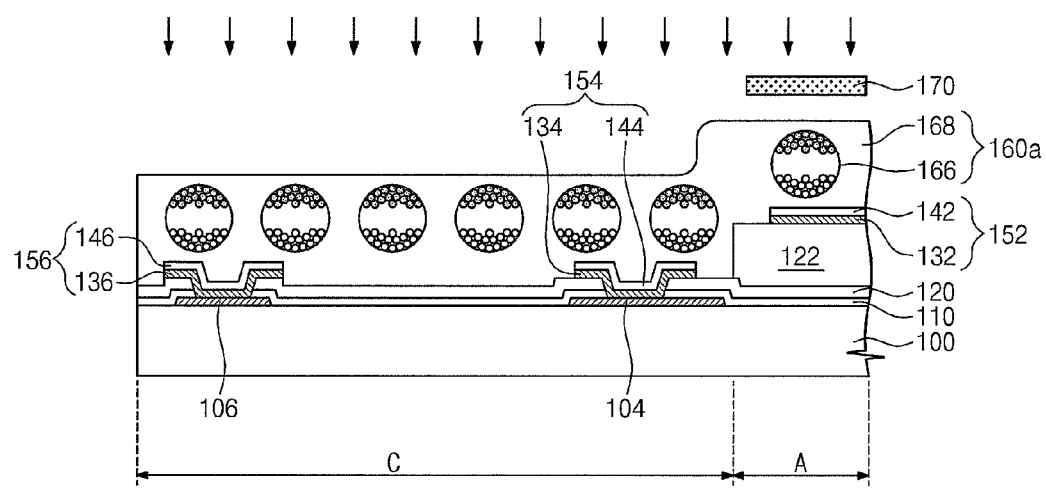

Referring to FIGS. 5A and 5B, a photolithography process is performed using a photo mask that covers the capsule layer 160 in the display area A and exposes the capsule layer 160 in the non-display area B and C. Thus, the capsule layer 160 in the display area A is not exposed to the light, and the capsule layer 160 in the non-display area B and C is exposed to the light.

Different from those shown in FIGS. 5A and 5B, according to an exemplary embodiment, the photolithography process is performed using a photo mask that covers the capsule layer 160 in the non-display area B and C and exposes the capsule layer 160 in the display area A, so that the capsule layer 160 in the display area A is exposed to the light and the capsule layer 160 in the non-display area B and C is not exposed to the light.

Figure 6A:
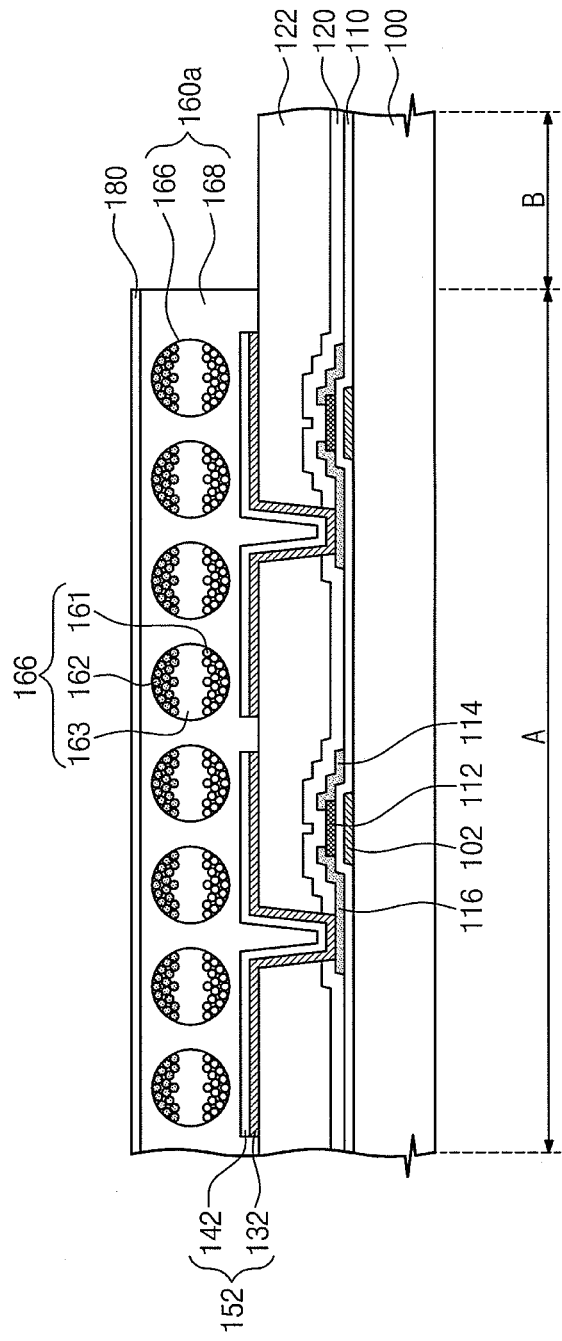
Figure 6B:
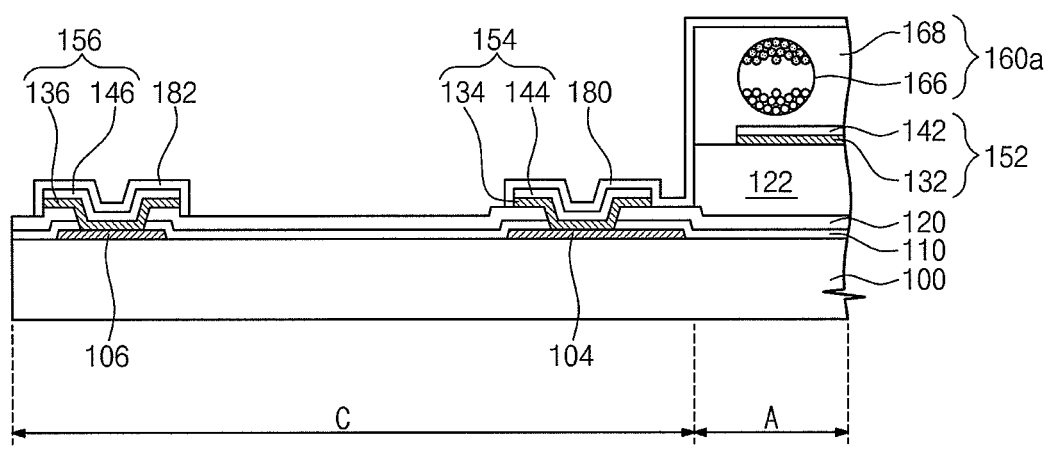

Referring to FIGS. 6A and 6B, the capsule layer 160 is removed from the non-display area B and C and remains in the display area A. The remaining capsule layer 160 forms the capsule pattern 160a. In detail, the capsule layer 160 exposed to the light is removed from the non-display area B and C, thereby forming the capsule pattern 160a in the display area A. According to an embodiment, the capsule pattern 160a is formed in the display area A by removing the capsule layer 160 from the non-display area B and C, which is not exposed.

According to an exemplary embodiment, the capsule pattern 160a in the display area A is formed by directly depositing the capsule layer 160 on the substrate 100 and by patterning the capsule layer 160. Accordingly, a process of attaching an adhesive layer including the display capsules 166 on the display area A may be omitted. As a result, defects caused by attaching the adhesive layer on the display area A may be prevented, thereby resulting in a high yield of the display apparatus.

According to an exemplary embodiment, the capsule pattern 160a is formed by performing the photolithography process on the capsule layer 160 that is directly deposited on the substrate 100, to thereby reduce the thickness of the display apparatus. In the case of forming the adhesive layer including the display capsules 166 on the display area A, a film (e.g., a PET film) on which the adhesive layer is formed is directly attached on the display area A with the adhesive layer. However, as described above, the embodiments of the present invention do not require the use of such a film, thus enabling production of a thinner display apparatus.

The common electrode 180 is formed on the capsule pattern 160a. The common electrode 180 covers a sidewall of the capsule pattern 160a and a sidewall of the second insulating layer 122, which are adjacent to the contact area C. The common electrode 180 covers the common voltage contact 154. The common electrode 180 includes a transparent conductive material. According to an exemplary embodiment, the common electrode 180 is formed of the same material as the upper pixel electrode 142.

The capping electrode 182 is formed to cover the pad contact 156. The capping electrode 182 is formed of a transparent conductive material. According to an exemplary embodiment, the capping electrode 182 is formed of the same material as the upper pad contact 146.

According to an embodiment, the common electrode 180 and the capping electrode 182 are formed by the same process. According to an embodiment, the common electrode 180 and the capping electrode 182 are formed by a single process. For instance, according to an embodiment, the common electrode 180 and the capping electrode 182 are formed by disposing a transparent conductive layer on the substrate 100 and by patterning the conductive layer.

Referring to FIGS. 2A and 2B again, the organic layer 191, the barrier layer 192, the coating layer 193, and the support layer 194 are sequentially formed on the common electrode 180 corresponding to the display area A. The organic layer 191 covers the sidewalls of the capsule pattern 160a, which are adjacent to the non-display area B and C. The organic layer 191 covers the common electrode 180 that covers a sidewall of the capsule pattern 160a adjacent to the contact area C. The barrier layer 192 and the coating layer 193 protect the organic layer 191 and the capsule pattern 160a. According to an embodiment, the support layer 194 includes the concavo-convex portions on an upper surface thereof. According to an embodiment, at least one of the organic layer 191, the barrier layer 192, the coating layer 193, or the support layer 194 may be omitted.

The flexible printed circuit board 310 is connected to the capping electrode 182 on the contact area C and the printed circuit board 320 is connected to the flexible printed circuit board 310.

Hereinafter, a display apparatus according to an exemplary embodiment of the present invention will be described with reference to FIGS. 7A, 8A, 9A, 10A, and 11A and FIGS. 7B, 8B, 9B, 10B, and 11B. According to the embodiment, capsule patterns including elements having different colors are disposed in display area A.

Figure 7A:
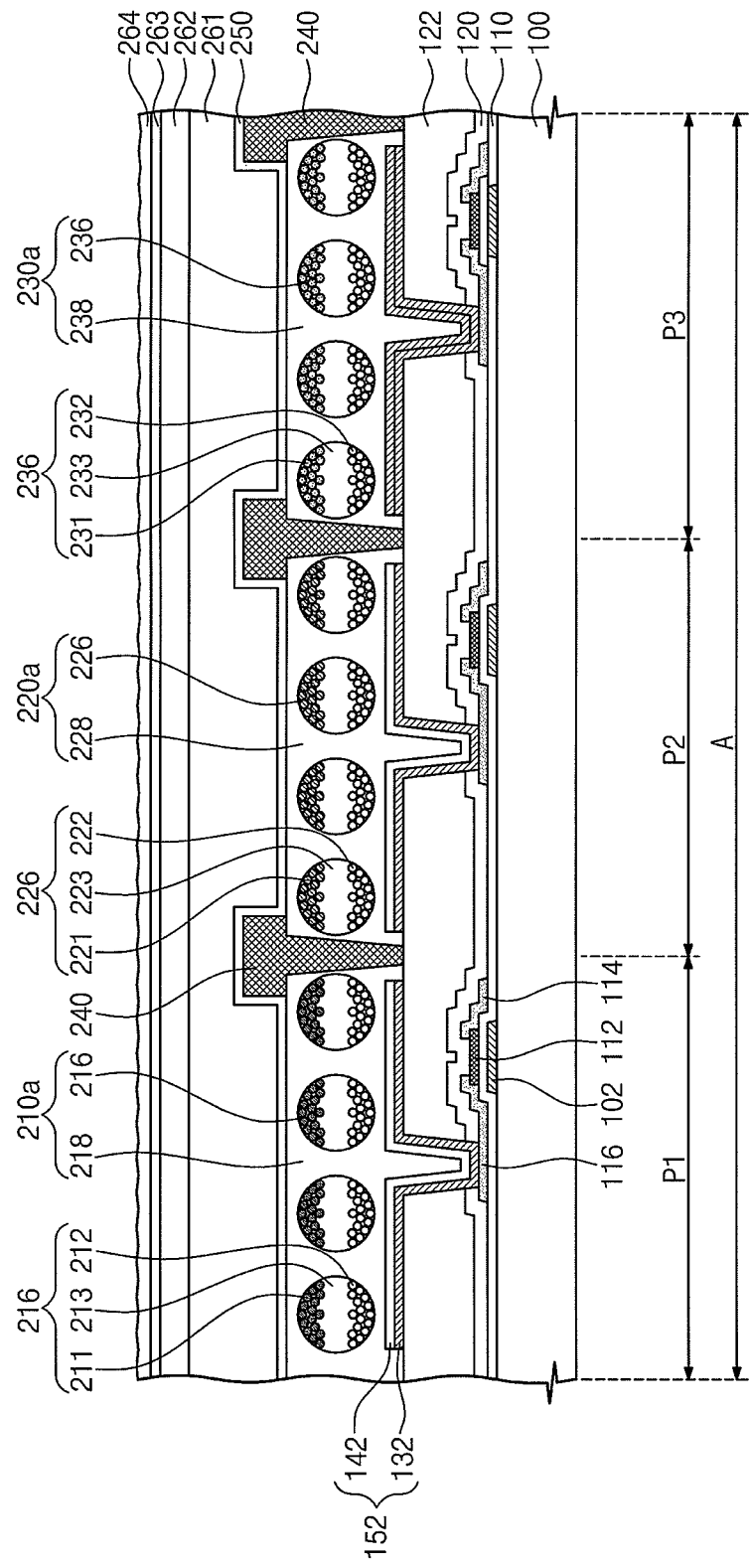
FIGS. 7A and 7B are cross-sectional views taken along lines I-I' and II-II', respectively, to show a display apparatus according to an exemplary embodiment of the present invention.
Figure 7B:
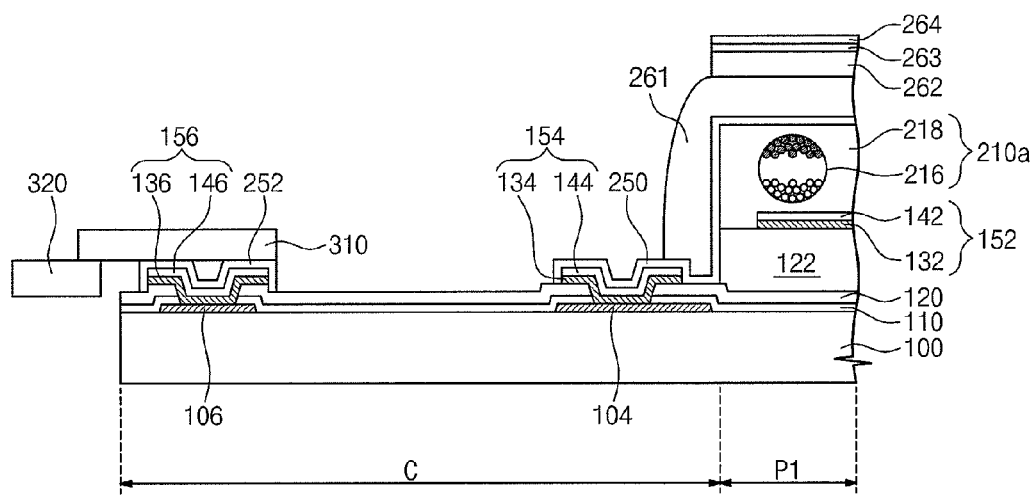

FIGS. 7A is a partial cross-sectional view taken along line I-I' of FIG. 1, and FIG. 7B is a cross-sectional view taken along line II-II' of FIG. 1.

Referring to FIGS. 1, 7A, and 7B, a substrate 100 including a display area A and a non-display area C is provided. The display area A includes first, second, and third areas P1, P2, and P3. The first area P1 includes a first pixel to display a first color, the second area P2 includes a second pixel to display a second color different from the first color, and the third area P3 includes a third pixel to display a third color different from the first and second colors.

The non-display area C surrounds the display area A. The common voltage line 104 and the pad electrode 106 are disposed on the non-display area C.

The gate electrode 102, the common voltage line 104, the pad electrode 106, the gate insulating layer 110, the semiconductor pattern 112, the source and drain electrodes 114 and 116, the first and second insulating layers 120 and 122, the pixel electrode 152, the common voltage contact 154, and the pad contact 156 are provided on the substrate 100 as shown in FIGS. 2A and 2B.

A plurality of thin film transistors each including the gate electrode 102, the semiconductor pattern 112, the source and drain electrodes 114 and 116 are provided. The thin film transistors are disposed in the first, second, and third areas P1, P2, and P3, respectively. Similarly, a plurality of pixel electrodes 152 are provided, which are respectively disposed in the first, second, and third areas P1, P2, and P3. The pixel electrodes 152 are connected to the thin film transistors in a one-to-one correspondence. For example, the pixel electrodes 152 are connected to the respective corresponding thin film transistors.

First, second, and third capsule patterns 210a, 220a, and 230a are disposed on the respective corresponding pixel electrodes 152 in the display area A. For example, the first to third capsule patterns 210a, 220a, and 230a are disposed on the first to third areas P1, P2, and P3, respectively. The first capsule pattern 210a includes first display capsules 216 and a first material pattern 218 surrounding the first display capsules 216, the second capsule pattern 220a includes second display capsules 226 and a second material pattern 228 surrounding the second display capsules 226, and the third capsule pattern 230a includes third display capsules 236 and a third material pattern 238 surrounding the third display capsules 236. According to an embodiment, the first to third material patterns 218, 228, and 238 include the same material, such as a cured photosensitive material.

Each first display capsule 216 includes a first element 211, a first base element 212, and a first medium 213 surrounding the first element 211 and the first base element 212. The first element 211 and the first base element 212 have different colors from each other. The first element 211 has a first color corresponding to a red color, a green color, or a blue color. The first base element 212 has an achromatic color. For instance, according to an embodiment, the first base element 212 has a black color. According to an exemplary embodiment, the first element 211 and the first base element 212 include electrophoretic particles that are distributed in the first medium 213. When an electric field is applied to the first display capsule 216, the first element 211 and/or the first base element 212 are moved in the first display capsule 216.

The second display capsule 226 includes a second element 221, a second base element 222, and a second medium 223 surrounding the second element 221 and the second base element 222. The second medium 223 includes the same material as the first medium 213. The second element 221 has a second color different from the first color. According to an embodiment, the second color is red, green, or blue. According to an exemplary embodiment, the second base element 222 has the same color as the first base element 212. According to an embodiment, the second element 221 and the second base element 222 include electrophoretic particles.

The third display capsule 236 includes a third element 231, a third base element 232, and a third medium 233 surrounding the third element 231 and the third base element 232. The third medium 233 includes the same material as the first and second media 213 and 223. The third element 231 has a third color different from the first and second colors. According to an embodiment, the third color is red, green, or blue. According to an exemplary embodiment, the third base element 232 has the same color as the first and second base elements 212 and 222. According to an embodiment, the third element 231 and the third base element 232 include electrophoretic particles.

Although it is illustrated in the figures that each of the first to third display capsules 216, 226, and 236 has a circular shape, according to an embodiment, each of the first to third display capsules 216, 226, and 236 is formed to have a polyhedron shape.

Black matrices 240 pass through the material patterns between the capsule patterns 210a, 220a, and 230a adjacent to the borders between the first, second, and third areas P1, P2, and P3. Each black matrix 240 includes a head portion and a leg portion. The head portion has a first width. The head portions are disposed above the capsule patterns 210a, 220a, and 230a. The leg portion has a second width narrower than the first width. The leg portions pass through the material patterns between the capsule patterns 210a, 220a, and 230a. The black matrices 240 are disposed between the first to third areas P1, P2, and P3 where the first to third pixels are respectively disposed. As a consequence, the black matrices 240 may prevent light interference between the first to third colors displayed from the first to third pixels.

The common electrode 250 is disposed on the first to third capsule patterns 210a, 220a, and 230a. The common electrode 250 covers a sidewall of the first capsule pattern 210a and a sidewall of the second insulating layer 122, which are adjacent to the contact area C. The common electrode 250 covers the common voltage contact 154 so that a common voltage may be applied from the common voltage line 104 to the common electrode 250.

The capping electrode 252 covers the pad contact 156. The capping electrode 252 is formed by the same process as the common electrode 250. According to an embodiment, the capping electrode 252 includes the same material as the common electrode 250.

Additional layers are disposed on the common electrode 250 corresponding to the display area A. The additional layers include an organic layer 261, a barrier layer 262, a coating layer 263, and a support layer 264, which are sequentially formed on the common electrode 250. The organic layer 261 covers the common electrode 250 that covers the sidewall of the capsule pattern 210a adjacent to the contact area C. The barrier layer 262 and the coating layer 263 protect the organic layer 261 and the capsule patterns 210a, 220a, and 230a. The support layer 264 includes concavo-convex portions on an upper surface thereof. According to an embodiment, at least one of the additional layers is omitted.

A flexible printed circuit board 310 is connected to the capping electrode 252. The flexible printed circuit board 310 is connected to the pad electrode 106 through the capping electrode 252 and the pad contact 156. A printed circuit board 320 is connected to the flexible printed circuit board 310 and connected to the pad electrode 106 through the flexible printed circuit board 310.

Hereinafter, a method of manufacturing a display apparatus will be described according to an exemplary embodiment of the present invention.

FIGS. 8A, 9A, 10A, and 11A are partial cross-sectional views taken along line I-I' of FIG. 1, and FIGS. 8B, 9B, 10B, and 11B are cross-sectional views taken along line II-II' of FIG. 1.

Figure 8B:
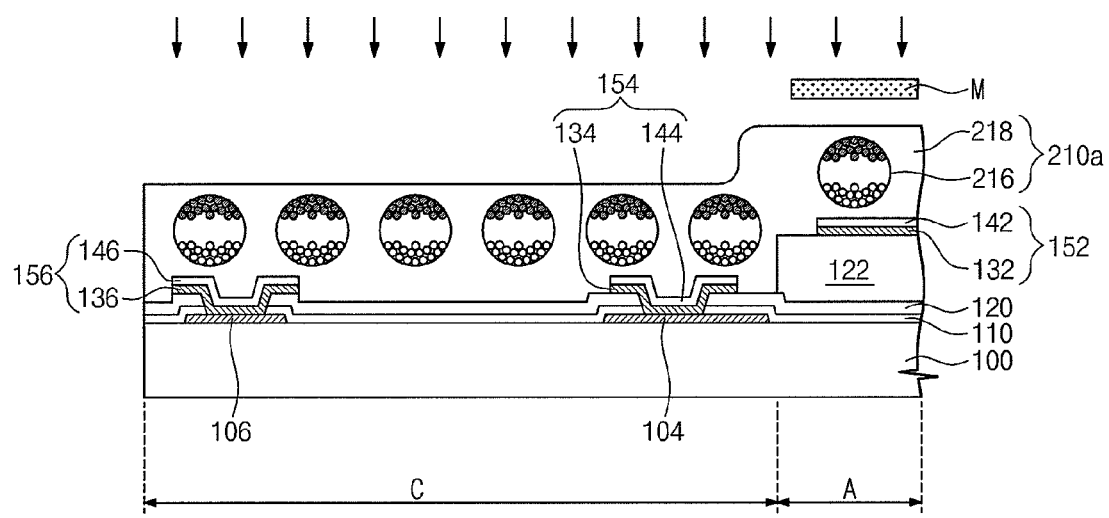

Referring to FIGS. 8A and 8B, a substrate 100 including a display area A and a non-display area C is prepared. The display area A includes first, second, and third areas P1, P2, and P3 where first, second, and third pixels are arranged respectively to display first, second, and third colors.

According to the method described with reference to FIGS. 3A and 3B, a gate electrode 102, a common voltage line 104, a pad electrode 106, a gate insulating layer 110, a semiconductor pattern 112, a source electrode 114, a drain electrode 116, a first insulating layer 120, a second insulating layer 122, a pixel electrode 152, a common voltage contact 154, and a pad contact 156 are provided.

A plurality of thin film transistors each including the gate electrode 102, the gate insulating layer 110, the semiconductor pattern 112, and the source and drain electrodes 114 and 116 may be provided. The thin film transistors are disposed in the first, second, and third areas P1, P2, and P3, respectively. According to an exemplary embodiment, a thin film transistor and a pixel electrode 152 connected to the thin film transistor are formed in each of the first, second, and third areas P1, P2, and P3.

A first capsule layer 210 is formed on the substrate 100 to cover the pixel electrode 152, the common voltage contact 154, and the pad contact 156. The first capsule layer 210 includes first display capsules 216 and a first material layer 218 surrounding the first display capsules 216. The first material layer 218 includes a photosensitive material. For instance, according to an embodiment, the first material layer 218 is a photoresist layer or an organic layer. Each first display capsule 216 includes a first element 211, a first base element 212, and a first medium 213 surrounding the first element 211 and the first base element 212.

A first photolithography process is performed using a photo mask M that covers the first capsule layer 210 disposed on the first area P1 and exposes the first capsule layer 210 disposed on the second area P2, the third area P3, and the non-display area C. Thus, the first capsule layer 210 in the first area P1 is not exposed to the light and the first capsule layer 210 in the second area P2, the third area P3, and the non-display area C is exposed to the light.

According to an exemplary embodiment, the first photolithography process is performed using a photo mask that covers the first capsule layer 210 in the second area P2, the third area P3, and the non-display area C and exposes the first capsule layer 210 in the first area P 1, so that the first capsule layer 210 in the first area P1 is exposed to the light and the first capsule layer 210 in the second area P2, the third area P3, and the non-display area C is not exposed to the light.

Figure 9B:
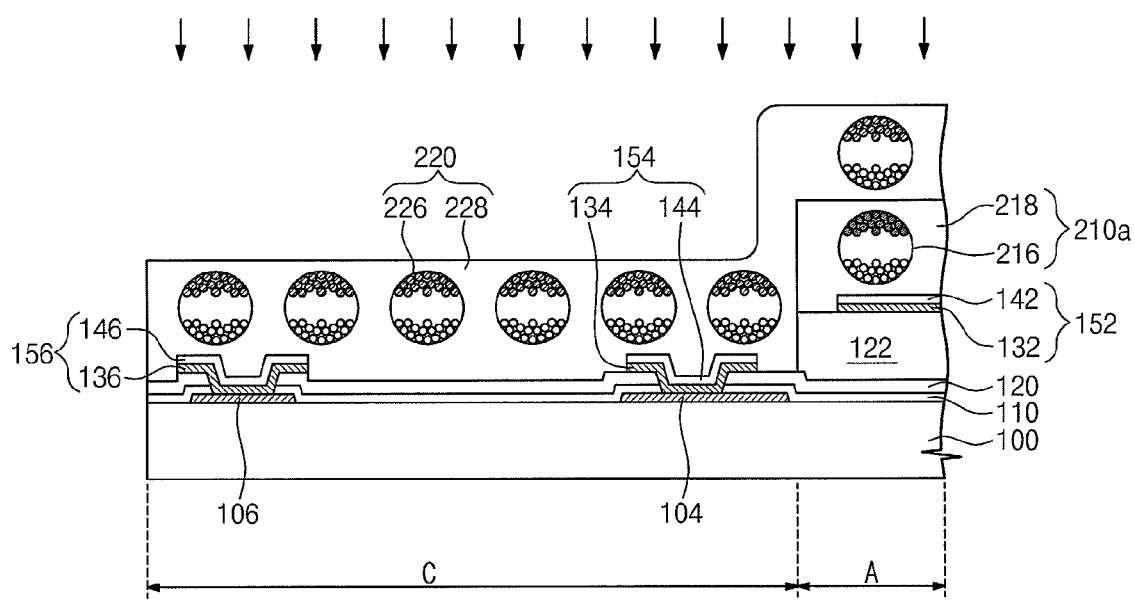

Referring to FIGS. 9A and 9B, the first photolithography process removes the first capsule layer 210 from the second area P2, the third area P3, and the non-display area C, thus forming a first capsule pattern 210a in the first area P1.

Then, a second capsule layer 220 is formed on the substrate 100. The second capsule layer 220 is coated on the substrate 100 to cover the first capsule pattern 210a, the pixel electrode 152, the common voltage contact 154, and the pad contact 156. The second capsule layer 220 includes second display capsules 226 and a second material layer 228 surrounding the second display capsules 226. The second material layer 228 includes the same material as the first material layer 218. Each second display capsule 226 includes a second element 221, a second base element 222, and a second medium 223 surrounding the second element 221 and the second base element 222.

A second photolithography process is performed using the photo mask M that covers the second capsule layer 220 on the second area P2 and exposes the second capsule layer 220 on the first area P1, the third area P3, and the non-display area C. The photo mask M is moved to the second area P2 before performing the second photolithography process.

According to an exemplary embodiment, the second photolithography process is performed using a photo mask that covers the second capsule layer 220 on the first area P1, the third area P3, and the non-display area C and exposes the second capsule layer 220 on the second area P2.

Figure 10B:
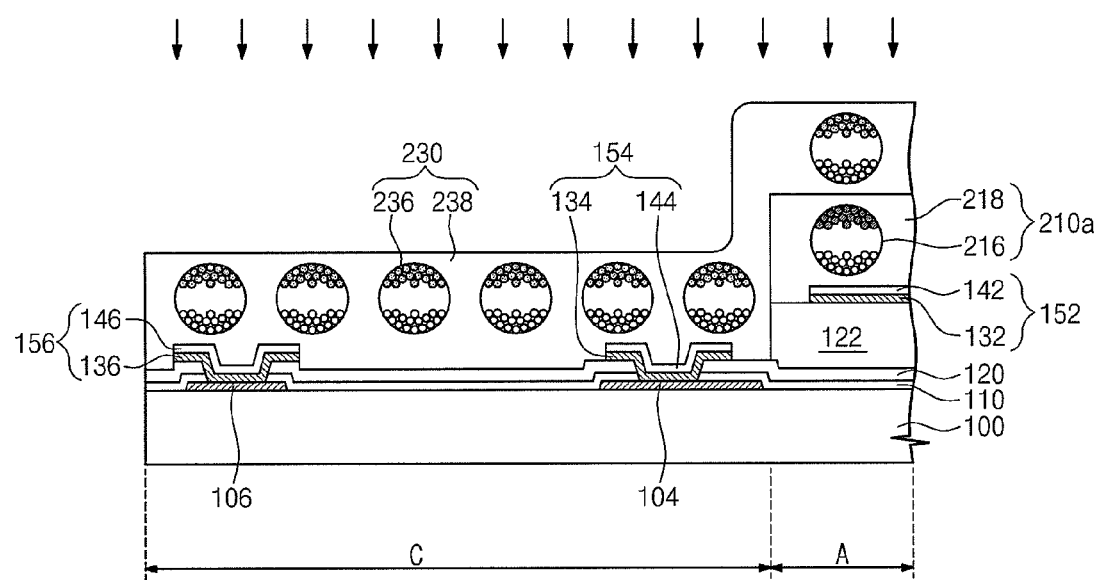

Referring to FIGS. 10A and 10B, the second photolithography process removes the second capsule layer 220 from the first area P1, the third area P3, and the non-display area C, thereby forming a second capsule pattern 220a on the second area P2.

A third capsule layer 230 is then formed on the substrate 100. The third capsule layer 220 is coated on the substrate 100 to cover the first capsule pattern 210a, the second capsule pattern 220a, the pixel electrode 152, the common voltage contact 154, and the pad contact 156. The third capsule layer 230 includes third display capsules 236 and a third material layer 238 surrounding the third display capsules 236. The third material layer 238 includes the same material as the first material layer 218. Each third display capsule 236 includes a third element 231, a third base element 232, and a third medium 233 surrounding the third element 231 and the third base element 232.

A third photolithography process is performed using the photo mask M that covers the third capsule layer 230 on the third area P3 and exposes the third capsule layer 230 on the first area P1, the second area P2, and the non-display area C. The photo mask M is moved to the third area P3 to cover the third area P3 before performing the third photolithography process.

According to an exemplary embodiment, the third photolithography process is performed using a photo mask that covers the third capsule layer 230 on the first area P1, the second area P2, and the non-display area C and exposes the third capsule layer 230 on the third area P3.

Figure 11A:
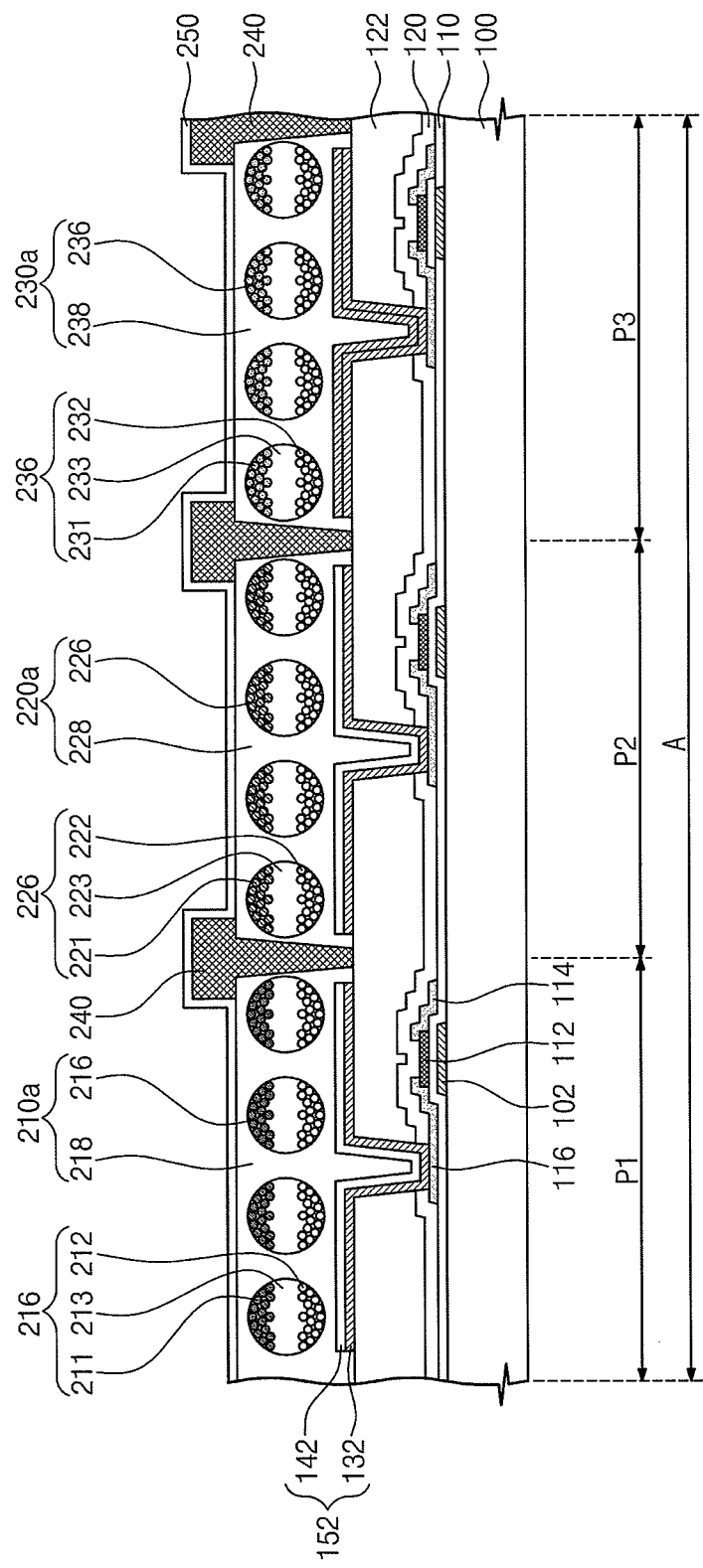
Figure 11B:
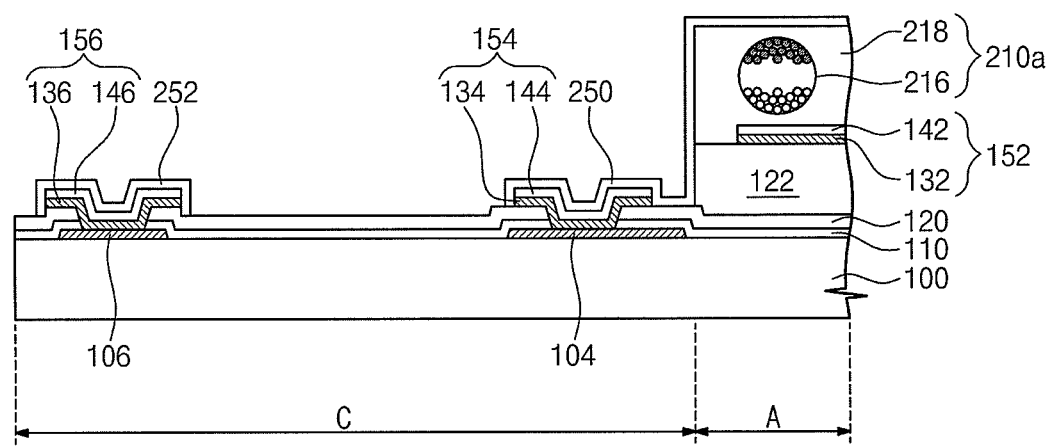

Referring to FIGS. 11A and 11B, the third photolithography process removes the third capsule layer 230 from the first area P1, the second area P2, and the non-display area C. As a result, a third capsule pattern 230a is formed on the third area P3.

As described above, the first, second, and third capsule patterns 210a, 220a, and 230a are formed by performing the first, second, and third photolithography processes on the first, second, and third capsule layers 210, 220, and 230. In the case that an adhesive layer including the display capsules is formed on the display area A, a film (e.g., a PET film) on which the adhesive layer is formed is directly attached on the display area A with the adhesive layer. The film may deteriorate color reproducibility and brightness of the display apparatus. However, as described above, the embodiments of the present invention do not require the film in manufacturing the display apparatus, thus enabling the display apparatus to have superior color reproducibility.

The first to third capsule patterns 210a, 220a, and 230a, respectively, include first to third display capsules 216, 226, and 236 that represent different colors from each other. As a consequence, no color filters are required to manufacture a display apparatus that may display color images, thereby increasing color reproducibility and brightness of the display apparatus.

Black matrices 240 are formed to pass through between the first to third capsule patterns 210a, 220a, and 230a adjacent to the borders between the first, second, and third areas P1, P2, and P3. According to an embodiment, the black matrices 240 are formed by passing holes through between the first to third capsule patterns 210a, 220a, and 230a and by filling the holes with a light blocking material.

Each black matrix 240 includes a head portion and a leg portion. The head portion has a first width. The head portions are disposed above the first to third capsule patterns 210a, 220a, and 230a. The leg portion has a second width narrower than the first width. The leg portions pass through between the first to third capsule patterns 210a, 220a, and 230a.

The common electrode 250 is disposed on the first to third capsule patterns 210a, 220a, and 230a to cover the black matrices 240. The common electrode 250 covers a sidewall of the first capsule pattern 210a and a sidewall of the second insulating layer 122, which are adjacent to the contact area C. The common electrode 250 covers the common voltage contact 154. The common electrode 250 includes a transparent conductive material that is the same as the upper pixel electrode 142.

A capping electrode 252 is formed to cover the pad contact 156. The capping electrode 252 is formed of a transparent conductive material. According to an exemplary embodiment, the capping electrode 252 is formed of the same material as the upper pad contact 146.

According to an embodiment, the common electrode 250 and the capping electrode 252 are formed by the same process. According to an embodiment, the common electrode 250 and the capping electrode 252 are formed by a single process. For example, the common electrode 250 and the capping electrode 252 are formed by forming a transparent conductive layer on the substrate 100 and by patterning the transparent conductive layer.

Referring to again FIGS. 7A and 7B, additional layers are disposed on the common electrode 252 corresponding to the display area A. The additional layers include an organic layer 261, a barrier layer 262, a coating layer 263, and a support layer 264, which are sequentially formed on the common electrode 252. The organic layer 261 covers the common electrode 252 that covers the sidewall of the first capsule pattern 210a adjacent to the contact area C. The support layer 264 includes concavo-convex portions on an upper surface thereof. According to an embodiment, at least one of the additional layers is omitted.

A flexible printed circuit board 310 is connected to the capping electrode 252 on the contact area C, and the printed circuit board 320 is connected to the flexible printed circuit board 310.

Although it has been illustrated that the elements disposed in the capsules include particles, the embodiments of the present invention are not limited thereto. For example, according to an embodiment, fluids having different colors are provided in the capsules. This embodiment will be described with reference to FIGS. 12A and 12B.

Figure 12A:
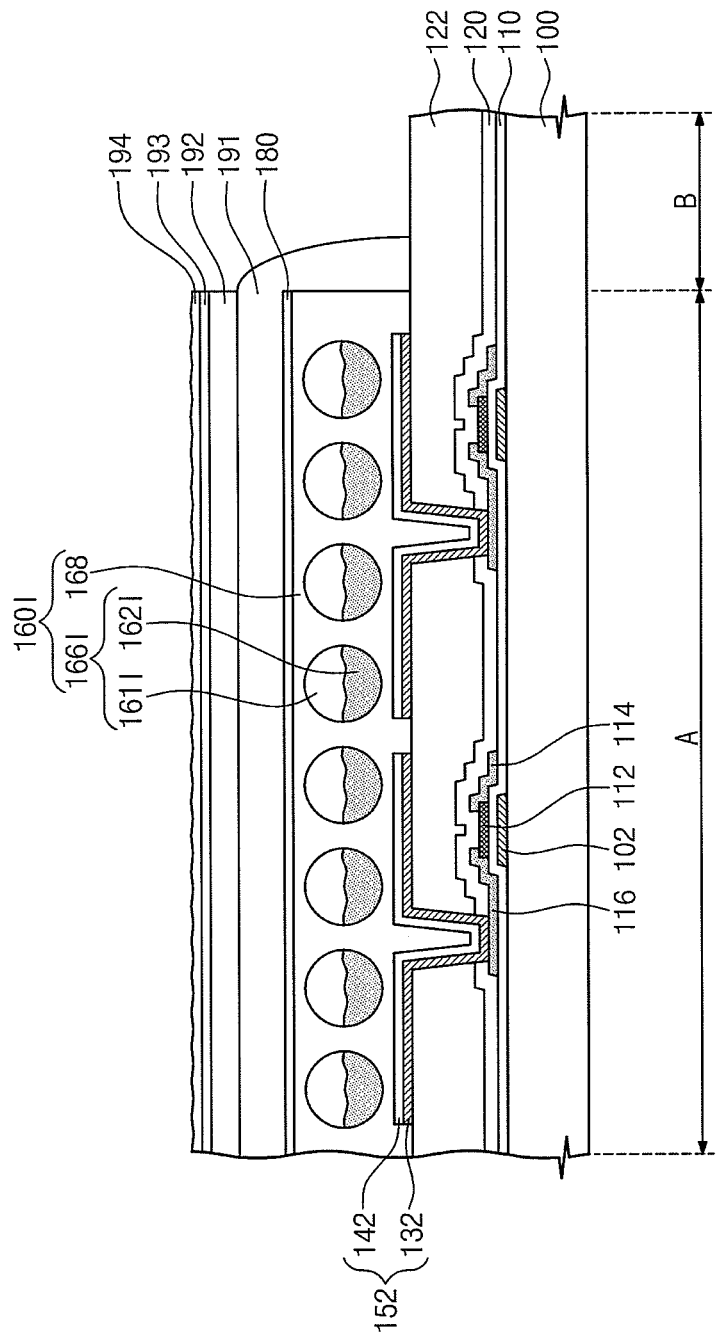

Referring to FIGS. 12A, a capsule pattern 160I is provided between the pixel electrode 152 and the common electrode 180 of the display apparatus as described with reference to FIG. 2A. The capsule pattern 160I includes capsules 166I and a material pattern 168 surrounding the capsules 166I. Each capsule 166I includes a first element 161I and a second element 162I. The first and second elements 161I and 162I include fluids having different colors. According to an embodiment, the first and second elements 161I and 162I are electrified with opposing polarities or with the same polarity. According to an embodiment, the first and second elements 161I and 162I have different electrification amounts. When an electric field is applied to the capsules 166I, the first and second elements 161I and 162I are moved. Although it has been illustrated in FIG. 12A that the first and second elements 161I and 162I are included in the capsules 166I, the number of elements included in the capsules 166I varies according to embodiments. Although it has been illustrated that the capsule 166I has a circular shape, according to an embodiment, the capsule 166I has a polyhedron shape.

Referring to FIG. 12B, first, second, and third capsule patterns 210I, 220I, and 230I are provided between the pixel electrodes 152 and the common electrode 250 of the display apparatus as described with reference to FIG. 7A. The first capsule pattern 210I is disposed on a first area P1, the second capsule pattern 220I is disposed on a second area P2, and the third capsule pattern 230I is disposed on a third area P3. The first capsule pattern 210I includes first capsules 216I and a first material pattern 218 surrounding the first capsules 216I, the second capsule pattern 220I includes second capsules 226I and a second material pattern 228 surrounding the second capsules 226I, and the third capsule pattern 236I includes third capsules 236I and a third material pattern 238 surrounding the third capsules 236I.

Each first capsule 216I includes a first element 211I and a first base element 212I. The first element 211I and the first base element 212I include fluids having different colors. The first element 211I has a first color, and the first base element 212 has an achromatic color. For instance, according to an embodiment, the first base element 212I has a black color. When an electric field is applied to the first capsule 216I, the first element 211I and/or the first base element 212I are moved in the first capsule 216I.

Each second capsule 226I includes a second element 221I and a second base element 222I. The second element 221I and the second base element 222I include fluids having different colors. The second element 221I has a second color different from the first color. According to an exemplary embodiment, the second base element 222I has the same color as the first base element 212I.

Each third capsule 236I includes a third element 231I and a third base element 232I. The third element 231I and the third base element 232I include fluids having different colors. The third element 231I has a third color different from the first and second colors. According to an exemplary embodiment, the third base element 232I has the same color as the first and second base elements 212I and 222I.

Although it has been illustrated that each of the first to third capsules 216I, 226I, and 236I has a circular shape, according to an embodiment, each of the first to third capsules 216I, 226I, and 236I has a polyhedron shape.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A display apparatus comprising:
a substrate including a display area which includes a plurality of pixels and a non-display area surrounding the display area; and
a capsule pattern on the display area, the capsule pattern including display capsules and a cured photosensitive material surrounding the display capsules, wherein each of the display capsules comprises an element that is moved by applying an electric field to the display capsules.

2. The display apparatus of claim 1, further comprising a common electrode on the display capsules, wherein the common electrode covers a sidewall of the capsule pattern adjacent to the non-display area.

3. The display apparatus of claim 2, further comprising:
a common voltage line on the non-display area, the common voltage line applying a common voltage to the common electrode; and
a common voltage contact connected to the common voltage line, wherein the common electrode covers the common voltage contact.

4. The display apparatus of claim 2, further comprising:
a pad electrode on the non-display area;
a capping electrode covering the pad electrode;
a flexible printed circuit board connected to the capping electrode; and
a printed circuit board connected to the flexible printed circuit board, wherein the capping electrode comprises a same material as the common electrode.

5. The display apparatus of claim 2, further comprising an organic layer contacting the common electrode, wherein the organic layer covers the common electrode on the sidewall of the capsule pattern.

6. The display apparatus of claim 1, wherein the display area comprises first, second, and third areas, wherein the display capsules comprise first, second, and third display capsules respectively including first, second, and third elements that respectively display first, second, and third colors, wherein the capsule pattern comprises first, second, and third sub capsule patterns including the first, second, and third display capsules, respectively, which are disposed on the first, second, and third areas, respectively.

7. The display apparatus of claim 6, further comprising:
a common electrode on the capsule pattern; and
a plurality of black matrices on border areas between the first, second, and third areas, wherein the common electrode covers the black matrices.

8. The display apparatus of claim 7, wherein each of the black matrices comprises a head portion on the capsule pattern and a leg portion passing through each of border areas between the sub capsule patterns, wherein the leg portion has a width narrower than a width of the head portion.

9. The display apparatus of claim 8, wherein the common electrode contacts an upper surface and a sidewall of the head portion of the black matrix.

10. The display apparatus of claim 1, wherein each of the pixels further comprises:
a switching device and a pixel electrode connected to the switching device between the substrate and the capsule pattern.

11. A method of manufacturing a display apparatus, comprising:
preparing a substrate comprising a first area, which includes a first pixel, and a second area;
forming a first capsule layer having one or more first display capsules on the substrate and a photosensitive material surrounding the first display capsules; and
performing a first photolithography process on the first capsule layer to remove the first capsule layer from the second area and to form a first capsule pattern having the first display capsules and a cured photosensitive material on the first area,
wherein each of the first display capsules comprises a first element having a first color, wherein the first element is moved by applying an electric field to the first display capsules.

12. The method of claim 11, wherein the first area includes a display area which displays an image, and the second display area includes a non-display area which does not display an image,
wherein preparing the substrate comprises forming a switching device and a pixel electrode connected to the switching device in the first pixel, wherein the first capsule layer is deposed on the pixel electrode.

13. The method of claim 12, further comprising forming a common electrode on the first capsule pattern.

14. The method of claim 13, wherein the non-display area comprises a contact area which includes a common voltage line applying a common voltage to the common electrode and a common voltage contact connected to the common voltage line, wherein the common electrode covers a sidewall of the first capsule pattern adjacent to the contact area and the common voltage contact.

15. The method of claim 14, wherein the contract area comprises a pad electrode that receives a signal from an external device to drive the switching device, wherein forming the common electrode comprises forming a capping electrode that covers the pad electrode.

16. The method of claim 11, wherein the second area includes a second pixel, wherein the substrate further comprises a third area that includes a third pixel, wherein the first capsule layer is formed on the third area and removed from the third area by the first photolithography process.

17. The method of claim 16, further comprising:
forming a second capsule layer having second display capsules on the substrate;
performing a second photolithography process on the second capsule layer to remove the second capsule layer from the first area and the third area and to form a second capsule pattern on the second area;

forming a third capsule layer having third display capsules on the substrate; and performing a third photolithography process on the third capsule layer to remove the third capsule layer from the first area and the second area and to form a third capsule pattern on the third area, wherein each of the second display capsule comprises a second element that has a second color and is moved by applying an electric field to the second display capsules, and each of the third display capsules comprises a third element that has a third color and is moved by applying an electric field to the third display capsules.

18. The method of claim 17, further comprising:

forming one or more black matrices between the first, second, and third capsule patterns; and forming a common electrode on the first, second, and third capsule patterns and the black matrices.

19. A method of manufacturing a display apparatus, comprising:

preparing a substrate including a display area and a non-display area;

forming a capsule layer on the substrate, wherein the capsule layer includes a plurality of capsules and a photosensitive material surrounding the capsules, wherein each of the capsules includes an element that is moved by application of an electric field; and performing photolithography on the capsule layer to form a capsule pattern having the capsules and a cured photosensitive material and remove the capsule layer from the non-display area.

20. The method of claim 19, further comprising forming a common electrode to cover a top surface and a side surface of a remaining part of the capsule layer and to cover a common voltage contact through which the common electrode is connected to a common voltage line.

* * * * *